(12) United States Patent
Mubarok et al.

(10) Patent No.: US 11,698,281 B2
(45) Date of Patent: Jul. 11, 2023

(54) REAL-TIME MEASUREMENT OF TWO-PHASE MASS FLOW RATE AND ENTHALPY USING PRESSURE DIFFERENTIAL DEVICES

(71) Applicant: PT. Pertamina Geothermal Energy, Jakarta (ID)

(72) Inventors: Mohamad Husni Mubarok, Jakarta Pusat (ID); Sadiq Jafar Mohammed Zarrouk, Auckland (NZ); John Edward Cater, Auckland Mail Centre (NZ)

(73) Assignee: PT. PERTAMINA GEOTHERMAL ENERGY, Jakarta (ID)

( * ) Notice: Subject to any disclaimer, the term of this patent is extended or adjusted under 35 U.S.C. 154(b) by 224 days.

(21) Appl. No.: 17/017,008

(22) Filed: Sep. 10, 2020

(65) Prior Publication Data

US 2021/0072060 A1 Mar. 11, 2021

(30) Foreign Application Priority Data

Sep. 10, 2019 (ID) .............................. P00201907940

(51) Int. Cl.
*G01F 1/74* (2006.01)
*G01K 17/06* (2006.01)
*G01F 1/36* (2006.01)

(52) U.S. Cl.
CPC .................. *G01F 1/74* (2013.01); *G01F 1/36* (2013.01); *G01K 17/06* (2013.01)

(58) Field of Classification Search
None
See application file for complete search history.

(56) References Cited

U.S. PATENT DOCUMENTS

| 4,244,216 A | * | 1/1981 | Dukelow | G01K 17/06 702/140 |
| 5,031,465 A | * | 7/1991 | Redus | G01N 11/08 73/29.03 |
| 7,637,167 B2 | * | 12/2009 | Monmont | G01F 1/88 73/861.27 |
| 7,640,133 B2 | * | 12/2009 | Monmont | G01N 25/60 702/50 |
| 8,849,589 B2 | * | 9/2014 | Wiklund | G01F 1/363 702/50 |

(Continued)

*Primary Examiner* — Harshad R Patel
(74) *Attorney, Agent, or Firm* — Myers Wolin, LLC (57) ABSTRACT

Geothermal two-phase flow metering device and measurement method in geothermal well and large diameter pipelines are disclosed herein. The method thereof is measuring the enthalpy and mass flow rate of the two-phase fluid in real-time. The device mainly includes a primary, a secondary and a multi-tapping pressure components. The primary component can be an Orifice plate or Nozzle or Venturi tube. The secondary component is a transmitters-transducers. The multi tapping pressure used are radius, flanges, and corners. The example system includes data signal of upstream pressure, downstream and the pressure difference of the multi tapping is recorded and calculated in the flow computer machine. A flow meter has good accuracy with less noise for a wide range of wells output and pipeline size range, which is very useful for the geothermal industry.

16 Claims, 7 Drawing Sheets

(56) References Cited

U.S. PATENT DOCUMENTS

| | | | |
|---|---|---|---|
| 2003/0074982 A1* | 4/2003 | Spielman | G01F 1/74 73/861.63 |
| 2004/0221660 A1* | 11/2004 | Dutton | G01N 9/002 73/861.354 |
| 2009/0266175 A1* | 10/2009 | Monmont | G01N 25/60 73/861.04 |
| 2009/0292484 A1* | 11/2009 | Wiklund | G01F 1/363 702/47 |
| 2015/0134275 A1* | 5/2015 | Chen | G01F 1/363 73/861.63 |
| 2022/0178590 A1* | 6/2022 | Toussaint | F17D 5/02 |

* cited by examiner

REAL-TIME MEASUREMENT OF TWO-PHASE MASS FLOW RATE AND ENTHALPY USING PRESSURE DIFFERENTIAL DEVICES

CROSS-REFERENCE TO RELATED APPLICATIONS

This application claims priority to Indonesian Patent Application No. P00201907940, filed Sep. 10, 2019, the entire contents of which are incorporated herein by reference.

BACKGROUND

Geothermal and thermal fluids which are utilized and used to produce electricity is related to the energy carried on and transferred by two-phase fluid flow (2), steam and liquid from reservoir or boiler to power plants. The measurement of two-phase fluids becomes very important in the geothermal and thermal industries as it relates to plant management and performance monitoring (1) on a geothermal field.

The parameters that are very important to be measured in real-time during the operation of geothermal wells are the mass flow rate (14) and enthalpy (12). By conducting continuous measurements on both parameters, the problem and performance of geothermal wells (1) or other thermal plants can be identified and mitigated quickly and accurately.

Most geothermal industries choose a centralized separation system design model at the facility of steam surface field due to the relatively low investment needed. In addition, the operation and maintenance of production facilities for the centralized separation model is simpler compared to other separation models, which are individual and satellites models. The consequence of the centralized separation model is the inability to measure the mass flow rate (14) and enthalpy (12) in real-time on every geothermal well (1) or above the ground pipeline individually. This is because the connected two-phase fluid pipe (5) becomes a single line to the separator. The fluid in the separator comes from a number of supplying geothermal wells so the mass flow rate (14) and enthalpy (12) is the mixing result of these wells.

Currently, there is no proven technology capable of measuring the mass flow rate (14) and enthalpy (12) from geothermal above the ground pipelines (2-3) simultaneously and in real-time. The unavailability of reliable measurement technology is one of the major contributors to the problem of geothermal field management due to the unavailability of mass flow rate data (14) and enthalpy (12) of two-phase fluid of geothermal above the ground pipelines (2-3) during the production time.

Inventions on this patent present a combined method and measuring instrument (6, 7) which is used to measure the mass flow rate (14) and enthalpy (12) of two-phase fluid from geothermal pipelines in real-time, with a relative error value below one percent. The measuring instrument method (6, 7) is developed using a pressure differential measurement approach which is the difference between the measured pressure on the upstream (3) and downstream sides (4) of several pressure measuring points through a series of experimental tests in some geothermal above the ground pipelines (2-3). From this measuring instrument (6, 7), three values of the upstream-downstream pressure differences are recorded (8-10). These three pressure difference data (8-10) are used to calculate the mass flow rate (14) and the enthalpy (12) continuously and simultaneously. This method and measuring instrument (6, 7) have been tested in above ground geothermal pipelines giving several advantages, such as the ability to perform real-time measurements, high accuracy, good repeatability, easy installation, wide measurement range, and efficient cost (investment, operational and maintenance).

SUMMARY

Figure 4:
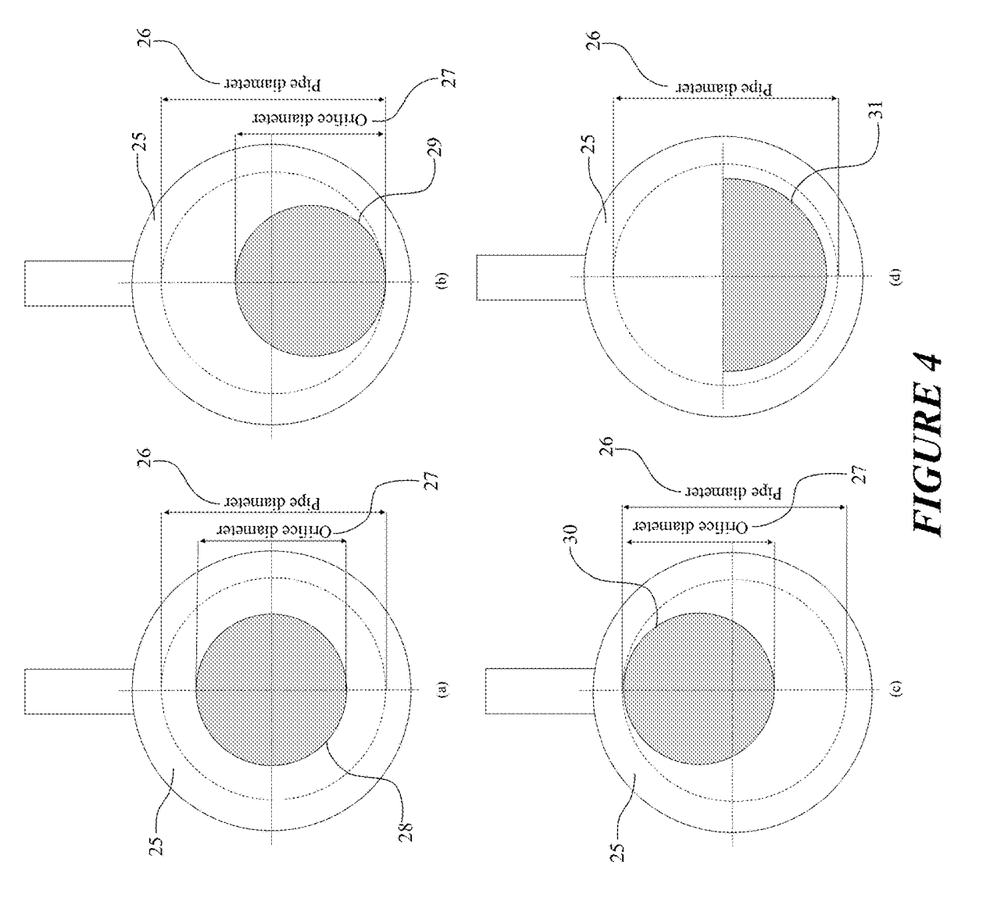
FIG. 4 is the orifice plate type: (a) concentric, (b) bottom eccentric, (c) top eccentric, and (d) segmental designs.

This invention relates to methods and measuring instruments (6, 7) to derive the value of mass flow rates (14) and enthalpy (12) of two-phase fluid simultaneously, continuously, and in real-time that have a low relative error ($\leq 1\%$). The measuring instrument is installed in a two-phase above the ground pipeline (5). In this measuring instrument (6, 7), a particular component that is in this invention can be an orifice plate (FIG. 4), a Nozzle (FIG. 5) or Venturi tube (FIG. 6) is installed in any two-phase above the ground pipeline (5). This particular component will provide a restriction and disturbance effect on the flow of two-phase fluids, causing a change in the speed and pressure of two-phase fluid within the above ground pipeline. The changes in the two-phase fluid pressure on the upstream (3) and downstream sides (4) are converted and calculated to derive the mass flow rate (14). In order to calculate the mass flow rate (14), the value of the two-phase fluid enthalpy needs to be known.

In this invention, the value of pressure difference between the upstream (3) and the downstream sides (4) of the measuring instrument components (6, 7) mounted on the two-phase pipe (5) have a correlation with the two-phase fluid enthalpy. By providing the estimated value of the enthalpy (11) of two-phase fluid, the enthalpy in real-time (12) can be obtained. The values of real-time enthalpy, pressure difference data (10) and mass flow rate estimate (13) are used as inputs in the equation algorithms to obtain the mass flow rate (14) in real-time.

When geothermal wells (1) or thermal plants are in production to supply steam to the power plant, the mass flow rate (14) and enthalpy (12) will undergo thermal properties change. Changes in the performance of geothermal wells (1) or thermal plants can be caused by several sources, such as the damage of the well casing or thermal above ground pipeline, the occurrence of silica or carbonate mineral deposits, a decrease in fluid temperatures and pressure decline. All these problems can be identified early by measuring and monitoring the mass flow rate (14) and enthalpy (12) continuously and in real-time.

The main purpose of this invention is to provide a method and measuring instrument (6, 7) which has the ability to measure the mass flow rate (14) and enthalpy (12) simultaneously and continuously. Currently, there are no methods and measuring instruments (6, 7) capable of measuring both parameters from only one device. Among the currently available two-phase fluid measurement methods, such as horizontal lip pipes, separators, tracer flow testing, calorimeter, radio frequency, load cells, and ultrasonic flow meters, it cannot perform real-time measurements of mass flow rate (14) and enthalpy (12) of two-phase fluids from geothermal above the ground pipelines.

For the measuring instruments (6, 7), which are installed in the geothermal wells (1) that are being operated to the power plant, the pressure signal generated from the flow and pressure barrier component (FIGS. 3-6) is transmitted from the transmitter and the transducer via a cable or wireless to the control room of the power plant which is then converted and computerized to derive the mass flow rate (14) and enthalpy (12). The mass flow rate (14) and enthalpy (12)

data as a function of time are then stored in the memory of the computer and can be made available when needed for analysis. For the measuring instruments (6, 7) installed for wells (1) that are being in the production testing, the instrumentation equipment is adjusted so that it can be installed and dismantled easily.

BRIEF DESCRIPTION OF THE DRAWINGS

To facilitate the presentation of the inventions, the images related to this invention follow.

DETAILED DESCRIPTION

The measuring instruments (6, 7) of mass flow rate, which are often used in the industry, employ a method which measures the difference between upstream (3) and downstream pressures (4). The principle of this measuring instrument (6, 7) refers to the energy conversion theory in the fluid flowing inside the closed above ground pipeline (5). The measuring instruments (6, 7) of pressure difference devices consist of primary and secondary components. The primary component is installed in the pipeline (5) for restricting flow and will cause the pressure difference between upstream (3) and downstream (4). The value of pressure difference from the measuring instrument (6, 7) is used to calculate the fluid mass flow rate (14) by applying the Bernoulli law. The secondary component is connected to the measuring instrumentation to provide information on the calculation variable of mass flow rates, such as pressure and temperature. Both the primary and secondary components can be installed as one unit or separated from the measuring instrument system (6).

Figure 1:
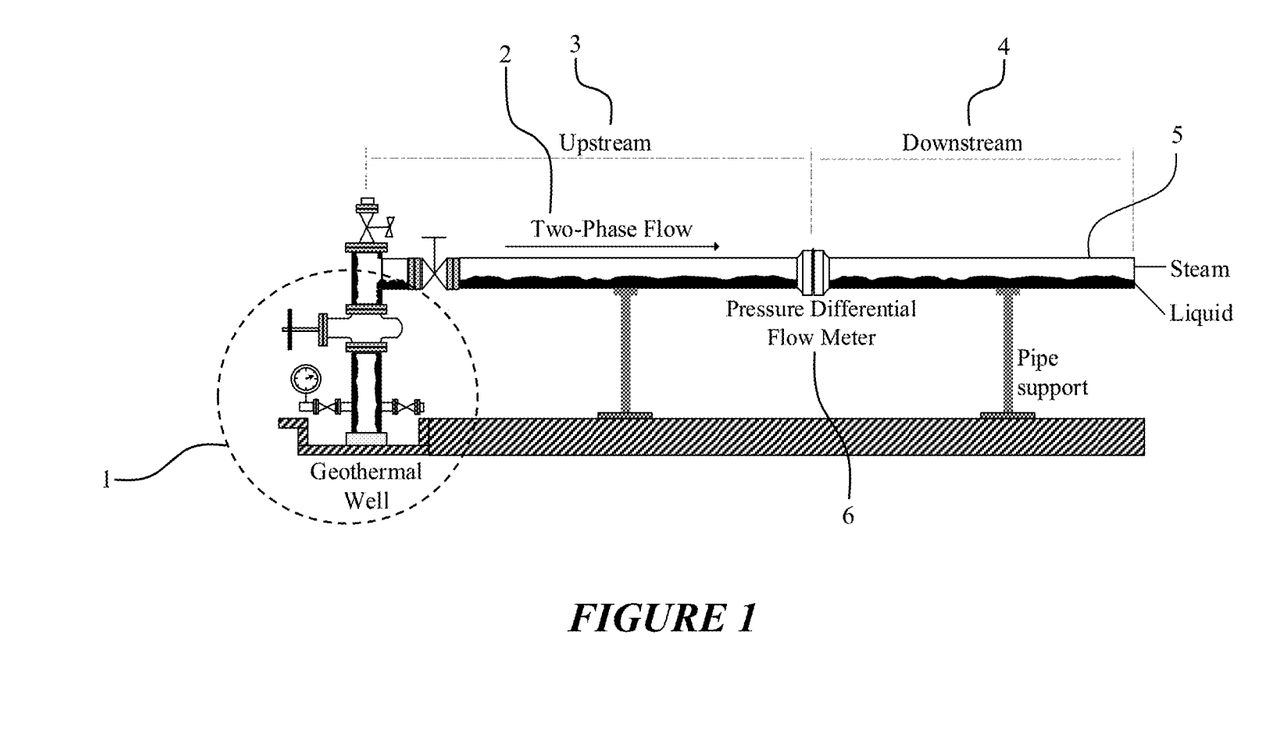
FIG. 1 is a simple schematic diagram of the two-phase fluid utilization from a geothermal well.

Real-time measurement techniques of geothermal two-phase fluids are developed based on the design of pressure differential devices (6, 7). In this invention, the measuring instrument of pressure difference includes orifice plates (FIGS. 3-4), Nozzle (FIG. 5) and a Venturi tube (FIG. 6). The installation of pressure difference measuring instruments (6, 7) on the above the ground pipeline (1, 5) can be seen in FIG. 1. The recommended installation for the measuring instruments (1) is that it is installed on a straight, unhindered pipe (5) with a minimum distance of 20 times the pipe inside diameter (26) on the upstream side (3) and 7 times the pipe inside diameter (26) on the downstream side (4). The longer the straight pipe distance (5), the smaller the error in the measurement results because the flow disturbance effects caused by pipe fittings, such as valve, reducer and elbow, can be minimized.

Figure 2:
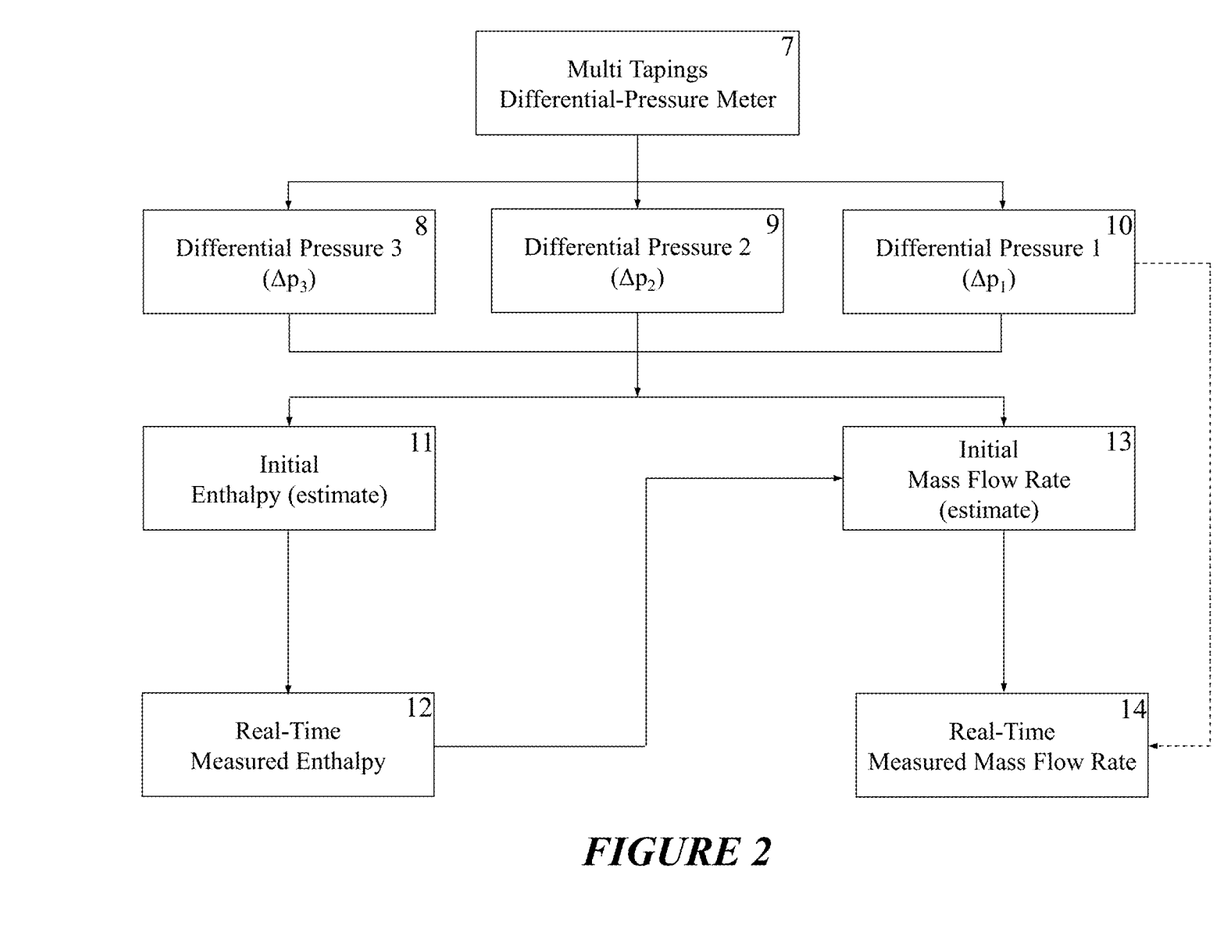
FIG. 2 is a flowchart of the method of measuring mass flow rate and enthalpy of two-phase fluid of a geothermal above the ground pipeline in real-time.
Figure 3:
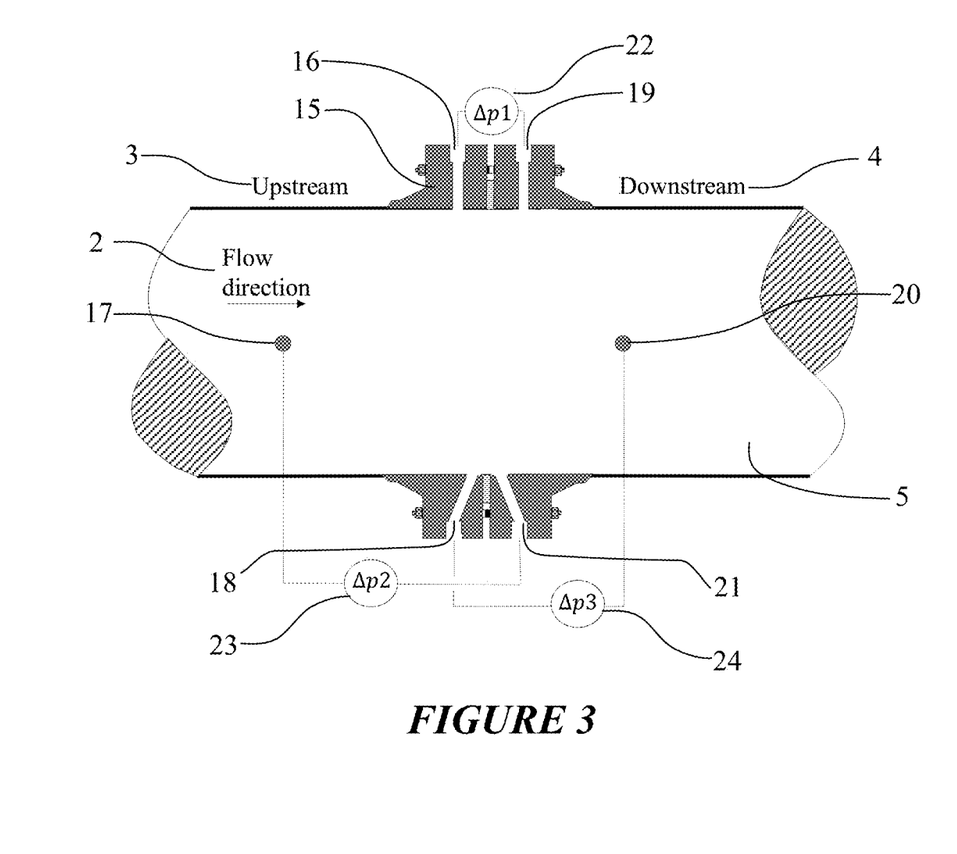
FIG. 3 is a top-view schematic diagram of the measuring instrument of mass flow rate and enthalpy of a geothermal well or a above the ground pipeline two-phase fluid flow with the multi-taping orifice plate type.
Figure 5:
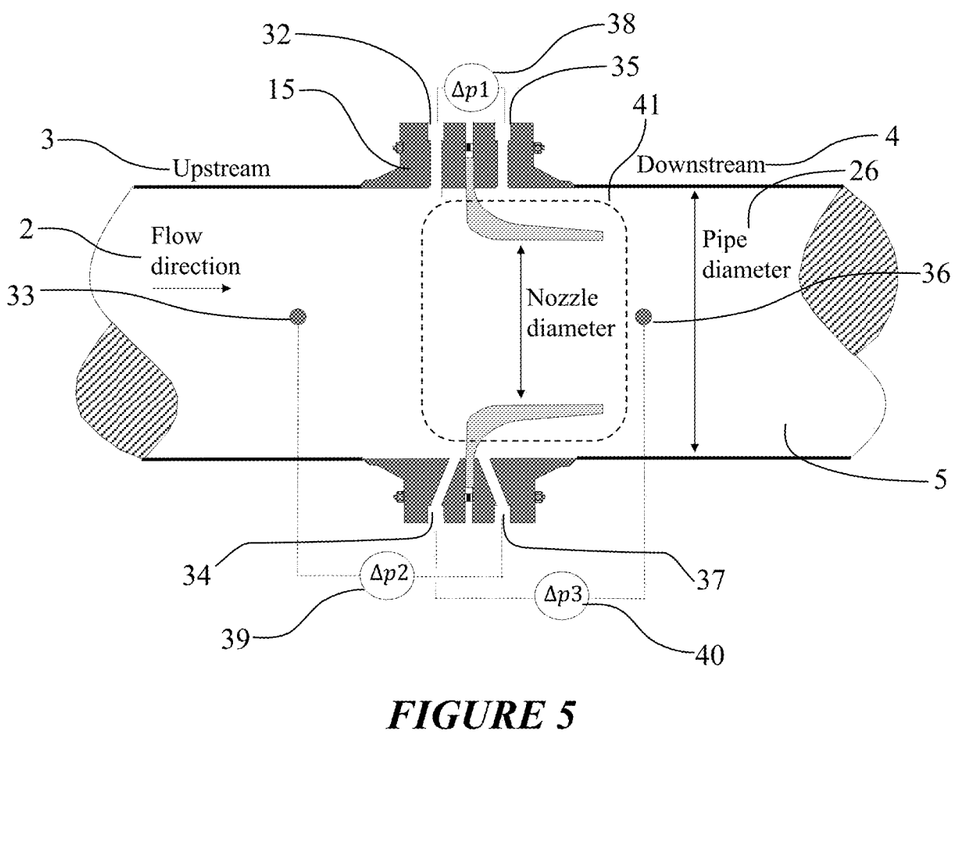
FIG. 5 is a top-view schematic diagram of the measuring instrument of mass flow rate and enthalpy of a geothermal well or a above the ground pipeline two-phase fluid flow with the multi-taping Nozzle type.
Figure 6:
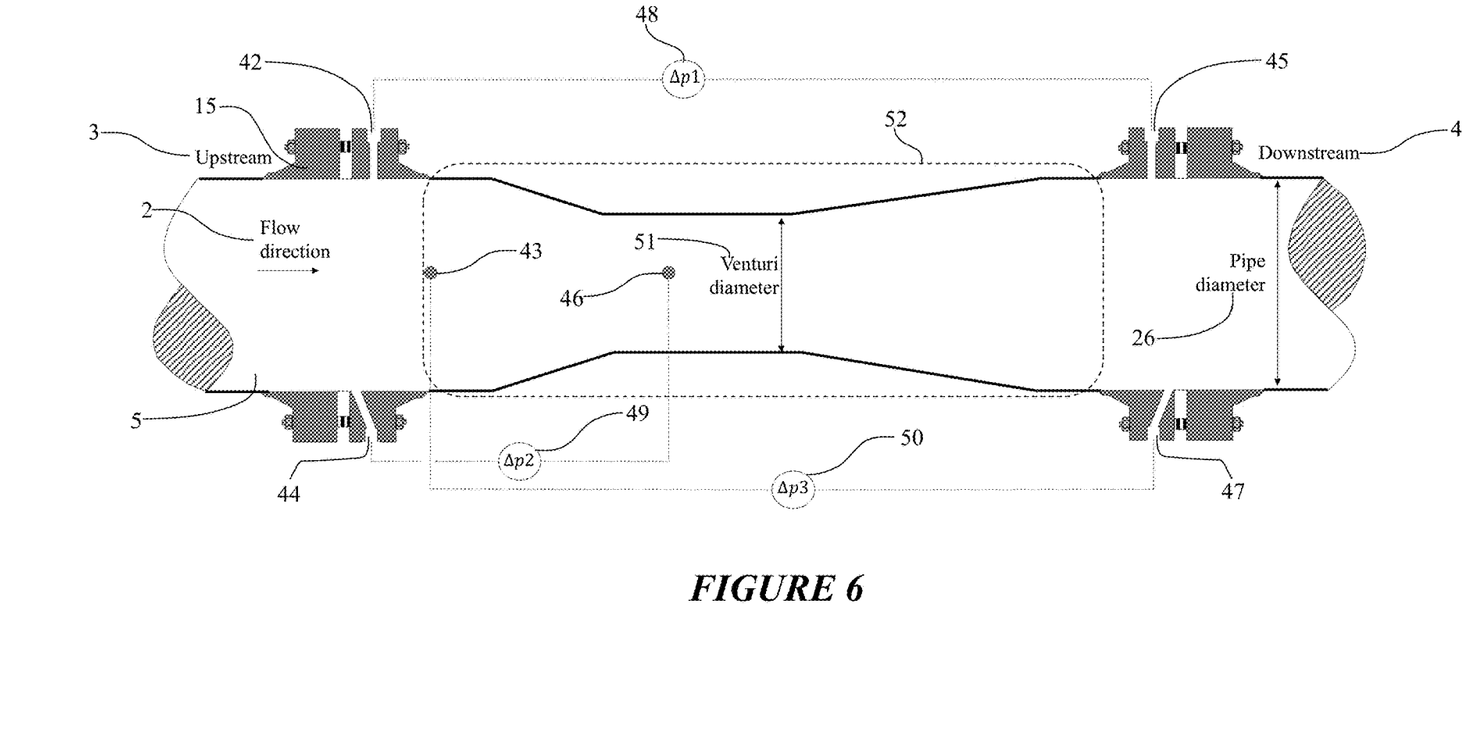
FIG. 6 is a top-view schematic diagram of the mass flow rate and enthalpy of the two-phase fluid flow of a geothermal well or the above ground pipeline with the Venturi tube multi-taping type.

The multi-pressure tapings (16-21, 32-37, 42-47) are installed into a single unit with the measuring instrument (6, 7). When the geothermal two-phase fluid flows towards the primary component (25, 41, 52) inside the pipe (5), then the pressure at that point is referred to as the upstream pressure (16-18, 32-34, 42-44). The two-phase fluid velocity will increase due to the narrowing area at the primary component (25, 41, 52) so that it causes the pressure decrease in the downstream side (19-21, 35-37, 45-47). This occurs due to increased friction between the fluid and the walls of the primary components (25, 41, 52) and also because of the flashing effect, namely the change of the liquid phase to steam in the two-phase fluid due to pressure drop. The difference between the upstream (16-18, 32-34, 42-44) and downstream pressures (19-21, 35-37, 45-47) is called a pressure difference, which is measured by the pressure transducer or gauge. The pressure difference will increase and decrease following the change in the mass flow rate (14) and enthalpy (12) in the above ground pipeline (5). In this invention, there are three upstream pressure values (16-18, 32-34, 42-44), three downstream pressure values (19-21, 35-37, 45-47), and three pressure difference values (22-24, 38-40, 48-50) that are recorded simultaneously. The system is called as multi-tapping. All measured values of the multi-tapping (upstream pressure, downstream pressure, and pressure difference) are correlated with enthalpy (12) and mass flow rate (14). Signals of multi-tapping pressure difference (22-24, 38-40, 48-50) are measured by the transmitters from the primary components (25, 41, 52). Then the signal from the transmitters is converted into electrical signals, which are processed and calculated in a computer to get the enthalpy. The noise of the resulting enthalpy is reduced by adding an input of enthalpy estimate value (11) and is reduced using the Kalman filter technique. The real-time enthalpy (12) is obtained and optimized from the results. The real-time enthalpy (12) and the real-time data of multi-tapping pressure differences (22-24, 38-40, 48-50) are used to calculate the mass flow rate. Noise in the measured mass flow rate is also reduced by using the Kalman filter technique. The algorithm of real-time measurement process of enthalpy (12) and mass flow rate (14) are presented in the following equation (FIG. 2):

$$h = K_h \left( h_{f(p_u)} + x h_{fg(p_u)} \right)$$

$$\dot{m}_t = \frac{K_m \left( \frac{p_u}{p_d} \right)^{D\sqrt{\frac{10^{-5}\Delta p}{D}}} \left( \frac{\pi d^2}{4} \right) (9 \times 10^5 h^{-2}) \sqrt{2\Delta p}}{\sqrt{1 - \beta^4}}$$

Where h is the two-phase enthalpy (kJ/kg), $K_h$ is the enthalpy correction factor, $h_f$ is the liquid enthalpy (kJ/kg), $h_{fg}$ is the latent enthalpy (kJ/kg), x is the dryness, $\dot{m}_t$ is the two-phase mass flow rate (kg/s), $K_m$ is the flow rate correction factor, $p_u$ is the upstream pressure from the tapping 1 (Pa), $p_d$ is the downstream pressure from the tapping 2 (Pa), $\Delta p$ is the differential pressure (Pa), d is the flow meter diameter (m), is the ratio of the device diameter to the inside pipe diameter (D), and 1-2-3 is the pressure tapping position (FIGS. 3, 5, 6).

Measuring instruments (6, 7) of the pressure difference with multi-tapping in this invention is applied to three types of measuring devices (6, 7) of pressure difference, namely orifice (FIG. 3), Nozzle (FIG. 5) and Venturi tube (FIG. 6). The multi-tapping design of the orifice and Nozzle has similarities, as seen in FIGS. 3 and 5. The first tapping position (17, 20, 33, 36) is placed vertically on the top of the pipe (5), while the second (16, 19, 32, 35) and the third tapping (18, 21, 34, 37) are placed horizontally on the flange (15). Other possible pressure-tapping designs and locations can also be applied to give a similar outcome.

Four types of orifice plates can be used in the measuring instruments in this invention, namely concentric (FIG. 4a), bottom eccentric (FIG. 4b), top eccentric (FIG. 4c), and segmental (FIG. 4d). The location of orifice holes (28) is placed in the middle of the pipe inside diameter (26) on the concentric type, while the position of orifice holes can be shifted to the lower position (29) or upper position (30) of the pipe inside diameter (26) for the eccentric type. In a segmental type orifice plate, the orifice holes (31) are placed at the lower position of the pipe inside diameter (26) with a segmented hole shape (31). Other possible orifice plate designs (type) can also be used to give a similar outcome. For the measuring instruments (6, 7), which use the Nozzle type, the configuration and location of the tapping follow that of the orifice type. The Nozzle installation direction (41) must be installed correctly and must be associated with the direction of the two-phase fluid flow (2) (FIG. 5).

The location of tapping on the Venturi tube type differs from the orifice and Nozzle, where the first (43, 46), the second (42, 45) and the third (44, 47) tapping are installed in accordance with FIG. 6. The position of the tapping holes on the flange (42, 44, 45, 47) is separated by the Venturi tube, the length of which is adjusted to the body of Venturi tube (52). The diameter of Venturi tube (51) is smaller than the pipe inside diameter (26) to produce a disturbance effect and resistance to the two-phase fluid flow.

The three alternative types of measuring instruments (6, 7) of real-time mass flow rate (14) and enthalpy (12) of two-phase fluids are designed and adapted to the application (FIGS. 3, 5, and 6). At the process design stage, attention should be paid to the physical parameters, including the desired range of pressure difference, the desired range of enthalpy and mass flow rate, the anticipated accuracy and the prediction of the total pressure drop of the measuring instrument.

Figure 7:
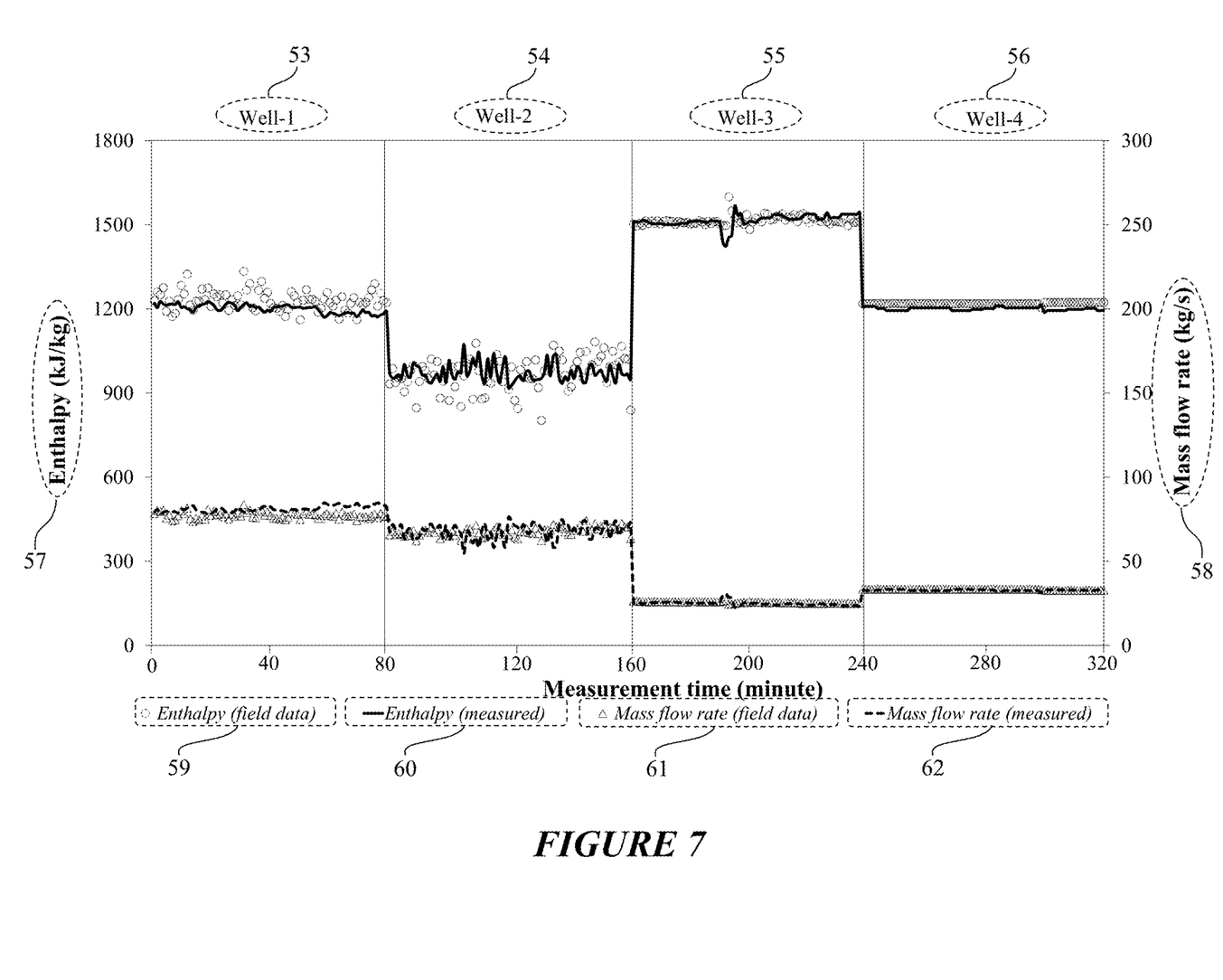
FIG. 7 is a comparison of the measurement results using the measuring instrument of mass flow rate gauge and enthalpy with real-time field data.

In this invention, methods and measuring instruments (6, 7) of real-time enthalpy and mass flow rate of a two-phase fluid have been verified and validated on a series of field tests on several two-phase above the ground pipelines. These methods and measuring instruments (6, 7) have been tested for a varying range of pipe sizes (26), enthalpy (57), and mass flow rates (58). A comparison of the resulting measurement of the enthalpy and the mass flow rate of two-phase fluid from the measuring instrument (60, 62) in this invention with the field data (59, 61) is presented in FIG. 7. FIG. 7 shows that the relative error to the field flow test data of the four geothermal wells (53-56) is less than one percent. The field test results show that the methods and measuring instruments (6, 7) of this invention can be implemented and applied to the measurement of mass flow rate (14) and enthalpy (12) of two-phase fluid in real time.

What is claimed is:

1. A method of calculation of mass flow rate and enthalpy for two-phase fluid, consisting of:
    measurements of transmitter signal of upstream pressure, downstream pressure and pressure differences ($\Delta p$) at multiple locations during the operation of the two-phase fluid flow in the above the ground pipeline;
    reception of signals from transmitters within the transducer which is in the form of electrical or pneumatic signals;
    the signal is recorded and converted into pressure units;
    use of a combination of two or all three pressure different arrangement ($\Delta p1$, $\Delta p2$ and $\Delta p3$) for the computation of enthalpy, in real-time, using the pressure data input of the transducer that varies in time units; and
    computation of mass flow rate, in real-time, using enthalpy real-time input and the pressure data of the transducer simultaneously and continuously.

2. The method of claim 1, where the two-phase fluid is a mixture of steam and water or other liquid and gas.

3. The method of claim 1, where real-time measurement of mass flow rate and enthalpy can be carried out on-line in production without having to stop the operation.

4. The method of claim 3, wherein a measured real-time signal of the upstream and downstream sides of two or three tapping, of these tapings are obtained two or three values of upstream pressure and two or three values of downstream pressure.

5. The method of claim 4, wherein, to acquire real-time enthalpy with minimum noise, the calculation results of real-time enthalpy is optimized using the Kalman filter technique in which this technique requires one initial input value (estimation) of enthalpy into an iteration algorithm.

6. The method of claim 1, where real-time measurement of mass flow rate and enthalpy can be used on geothermal wells or other above the ground pipelines in operation and supplying steam to the plant and or on the geothermal wells or pipelines that are in production or during testing.

7. The method of claim 6, wherein the pressure difference value of all pressure tapings is calculated by subtracting the upstream pressure from the downstream pressure.

8. The method of claim 1, where the frequency of data acquisition can be adjusted according to the requirements.

9. The method of claim 1, where the attenuation of signal strength sent by the transmitter to the transducer, will follow the pressure changes that occur in the pipeline.

10. The method of claim 1, wherein two values of upstream pressure, two values of pressure difference occurring on both sides of a pressure differential devices, and a diameter ratio ($\beta$) is used to obtain a steam mass fraction or a dryness fraction.

11. The method of claim 1, wherein a value of the pipe inside diameter is used to determine an enthalpy correction factor.

12. The method of claim 1, wherein the upstream pressure value, a steam mass fraction and an enthalpy correction factor are used to calculate the real-time enthalpy.

13. The method of claim 12, wherein, to acquire real-time mass flow rate with minimum noise, the calculation result of real-time mass flow rate is optimized using the Kalman filter technique where this technique requires one initial (estimated) input value for an iterations algorithm.

14. The method of claim 1, wherein a pipe inside diameter is used to determine a mass flow rate correction factor.

15. The method of claim 1, wherein one upstream pressure value, one pressure difference value and a flow rate correction factor are used to calculate the real-time mass flow rate.

16. The method of claim 1, wherein a calculation and iteration of the mass flow rate and enthalpy is carried out using the computation system where the process of algorithm model is designed specifically so that the measurements are obtained in real-time and simultaneous in the given measurement range continuously.

\* \* \* \* \*